United States Patent [19]

Ishida et al.

[11] Patent Number: 4,791,910
[45] Date of Patent: Dec. 20, 1988

[54] SOLAR HEAT COLLECTOR

[75] Inventors: Masaharu Ishida, Shizuoka; Isamu Yamamoto, Hamamatsu, both of Japan

[73] Assignee: Yazaki Corporation, Tokyo, Japan

[21] Appl. No.: 622,403

[22] Filed: Jun. 21, 1984

Related U.S. Application Data

[63] Continuation of Ser. No. 323,302, Nov. 20, 1981, abandoned.

[51] Int. Cl.$^4$ .............................................. F24J 2/56
[52] U.S. Cl. ................................. 126/450; 126/441
[58] Field of Search ......................... 126/441, 448, 450

[56] References Cited

U.S. PATENT DOCUMENTS

| | | | |
|---|---|---|---|
| 4,019,496 | 4/1977 | Cummings | 126/441 |
| 4,078,544 | 3/1978 | Hollands et al. | 126/441 |
| 4,114,597 | 9/1978 | Erb | 126/448 |
| 4,244,354 | 1/1981 | Williams | 126/448 |
| 4,262,657 | 4/1981 | McCullough et al. | 126/441 |

OTHER PUBLICATIONS

Use of Lexan and Kapton Honeycombs to Increase Solar Collector Efficiency, Marshall & Wedel, Submitted through AIChE HT & EC Division for 1976 Nat'l Heat Transfer Conference.

End Clearance Effects on Rectangular-Honeycomb Solar Collectors, Edwards, Arnold, Catton, Solar Energy, vol. 18, pp. 251-257, Feb. 1976.

Primary Examiner—Samuel Scott
Assistant Examiner—Noah Kamen
Attorney, Agent, or Firm—Koda and Androlia

[57] ABSTRACT

A solar heat collector, in which an absorber plate is located in a box member provided at one surface thereof with a transparent sheet, being of such an arrangement that the absorber plate has been subjected at the surface thereof to a selective absorption surface treatment and a transparent heat trap formed of a fluoroplastics film and having a height of about ½ of the interval across the transparent sheet and the absorber plate is disposed between the transparent sheet and the absorber plate in contact with the transparent sheet. With this arrangement, the heat losses caused by convection, radiation and conduction can be suppressed at the same time.

6 Claims, 6 Drawing Sheets

SOLAR HEAT COLLECTOR

This is a continuation of application Ser. No. 323,302, filed Nov. 20, 1981, now abandoned.

BACKGROUND OF THE INVENTION

1. Field of the Invention

This invention relates to a solar heat collector for a hot water supply, solar heat air conditioning systems and the like.

2. Description of the Prior Art

Heretofore, there have been proposed various types of solar heat collectors for the hot water supply, solar heat air conditioning systems and the like.

FIG. 1 is an explanatory view illustrating a solar heat collector 1 widely used. This solar heat collector 1 comprises: an absorber plate 2 for converting the solar rays into thermal energy to transmit the thermal energy to a heat transfer medium such as water; a heat transfer medium flow path 3 formed in the absorber plate 2; a transparent sheet 4 made of glass or the like for preventing the convection heat loss from the absorber plate 2 and protecting the absorber plate 2 against the contamination and damages caused by the external factors; a heat insulating material 5 for preventing the heat loss through the rear surface of the solar heat collector; and an outer box 6 for protecting the absorber plate 2 and the insulating material 5, totally covering the solar heat collector in cooperation with the transparent sheet 4.

The collector performance of the abovedescribed solar heat collector is improved by suppressing the convection radiation and conduction losses from the absorber. As the methods of suppressing the heat losses described above, heretofore, there have been adopted such methods that the surface of the absorber plate 2 is subjected to a selective absorption surface treatment for suppressing the radiation heat loss, a convection preventive structure such as a honeycomb transparent heat trap for suppressing the convection heat loss is provided between the absorber plate 2 and the transparent sheet 4.

FIGS. 2 and 3 are explanatory views showing the conventional solar heat collectors 10 and 20 having convection preventive structures, respectively. In the solar heat collector 10 shown in FIG. 2, the honeycomb heat trap 11 is provided between an absorber plate 2 and a transparent sheet 4 in a manner to contact both the absorber plate 2 and the transparent sheet 4. Furthermore, in the solar heat collector 20 shown in FIG. 3, a honeycomb heat trap 21 is provided between the absorber plate 2 and the transparent sheet 4 in a manner to contact the absorber plate 2, but not to contact the transparent sheet 4.

However, in the abovedescribed conventional solar heat collectors 10 and 20, the honeycomb heat traps 11 and 21 are provided in a manner to contact the absorber plate 2, whereby the heat traps are heated to radiate large quantities of infrared rays, with the result that the radiation heat losses from the honeycomb heat traps 11 and 21 to the transparent sheets 4 increase to a high extent irrespective of that the absorber plates 2 have been subjected to the selective absorption surface treatment for suppressing the radiation heat losses on the surfaces of the absorber plates 2. Furthermore, in the conventional solar heat collector 10 and 20, the honeycomb heat traps 11 and 21, being disposed in contact with the absorber plates heated to a high temperature, are required to have a durability for temperature up to 200°–250° C. Additionally, as shown in FIG. 2, in the solar heat collector 10, in the case of the honeycomb heat trap 11 being located in close contact with the absorber plate 2 and the transparent sheet 4, it presents a disadvantage that the honeycomb heat trap 11 may be broken down when the transparent sheet 4 is deformed due to an external force such as wind pressure, snow load or the like.

SUMMARY OF THE INVENTION

The present invention has been developed to obviate the abovedescribed disadvantages of the prior art and has as its object the provision of a solar heat collector wherein the maximum service temperature required for a heat trap is low, the heat trap is set at a state where possibilities of break-down is eliminated, and heat losses of three forms due to convection, radiation and conduction can be suppressed.

To achieve the abovedescribed object, the present invention contemplates that a solar heat collector, wherein an absorber plate is located in a box member provided at one of the outer surface thereof with a transparent sheet, is of such an arrangement that the surface of the absorber plate is subjected to selective absorption surface treatment, a transparent heat trap is interposed between the transparent sheet and the absorber plate in such a manner that the height of the heat trap is substantially one half of the interval across the transparent sheet and the absorber plate and the heat trap is disposed in contact with the transparent sheet.

BRIEF DESCRIPTION OF THE DRAWINGS

The above mentioned features and objects of the present invention will become more apparently with reference to the following description taken in conjunction with the accompanying drawings, wherein like reference numerals denote like elements and in which.

DESCRIPTION OF THE PREFERRED EMBODIMENTS

Description will hereunder be given of the results of experiments conducted by the inventors, which have led to the development of the present invention.

Figure 4:
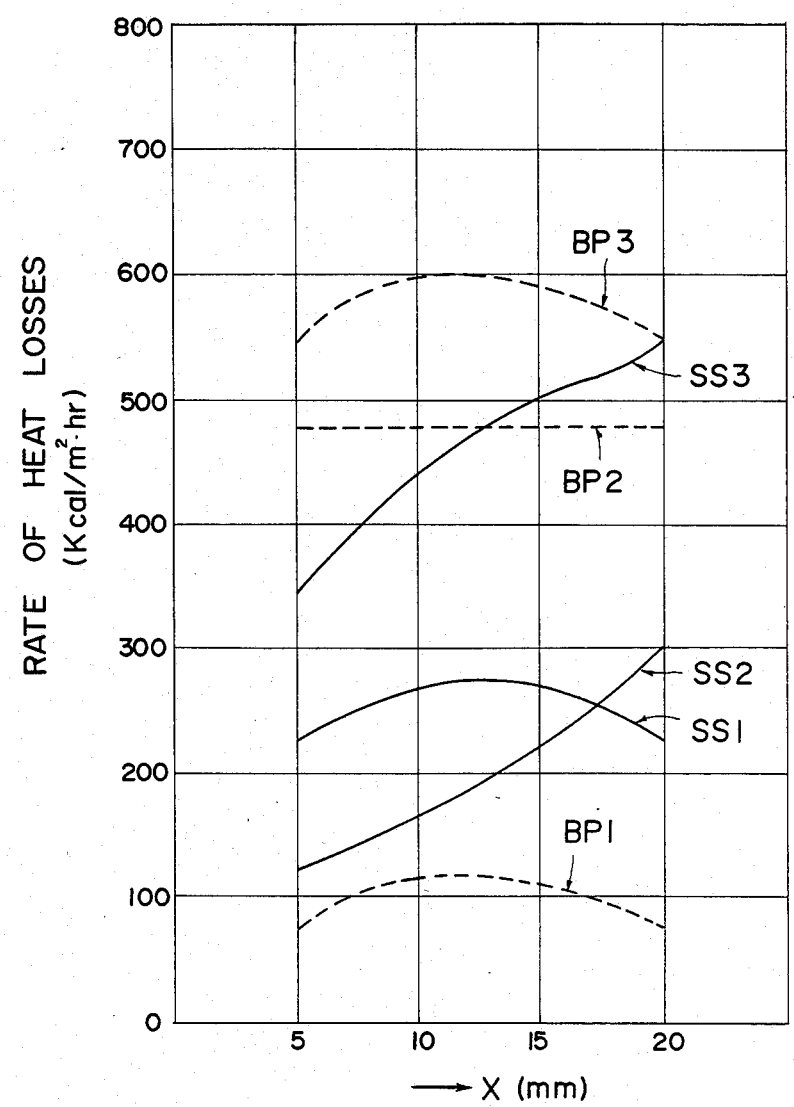
FIG. 4 is a chart showing the rate of heat losses from a solar heat collector.
Figure 5:
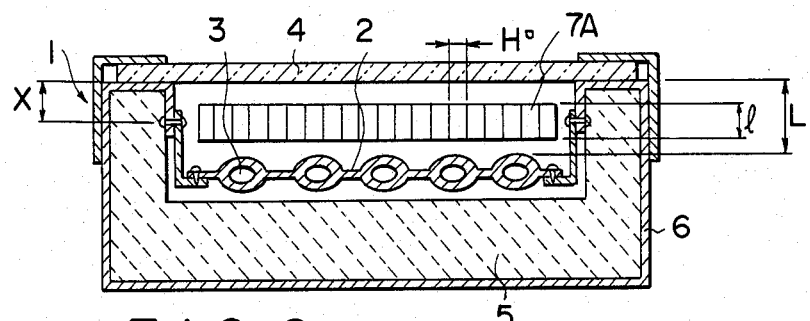
FIG. 5 is a sectional view of the solar heat collector used for obtaining the characteristic curves shown in FIG. 4.

FIG. 4 is a chart showing the influences rendered to the quantities of radiated heat by the positions where the transparent heat trap 7A was provided between the transparent sheet and the absorber plate as shown in FIG. 5. In this experiment as shown in FIG. 5, a heat trap 7A having a height 1 (10 mm) and being formed of collectively assembled square pillars each being hollow and having openings of H×H (5 mm×5 mm) was moved from a position contacting the transparent sheet 4 to a position contacting the absorber plate 2 within an interval L (25 mm) across the transparent sheet 4 and the absorber plate 2. During that movement, the rates of heat losses were measured at respective positions where the heat trap 7A is provided. Here, in FIG. 5, the provision of the heat trap 7A is shown at a position where the center of the heat trap 7A is spaced apart a distance x from the transparent sheet 4. Additionally, in this experiment, an absorber plate subjected at the surface thereof to a black color coating treatment of non selective absorption (BP) and another absorber plate subjected to at the surface thereof to a selective absorption surface treatment (SS) were used, and the above-described rates of heat losses were measured under the use of the respective absorber plates.

More specifically, in FIG. 4, there are shown a convection heat loss BP1, a radiation heat loss BP2 and a sum in value of convection and radiation heat losses BP3 under the use of the black color coating treated absorber plate 2 and a convection heat loss SS1, a radiation heat loss SS2 and a sum of convection and radiation heat losses SS3 under the use of the selective absorption surface treated absorber plate 2 respectively in correspondence to the position where the heat trap 7A are provided. According to the results of this experiment, it was ascertained that the rate of heat losses in the solar heat collector reached the minimum value when the absorber plate 2 had been subjected at the surface thereof to the selective absorption surface treatment and the transparent heat trap 7A was disposed in contact with the transparent sheet 4.

Figure 6:
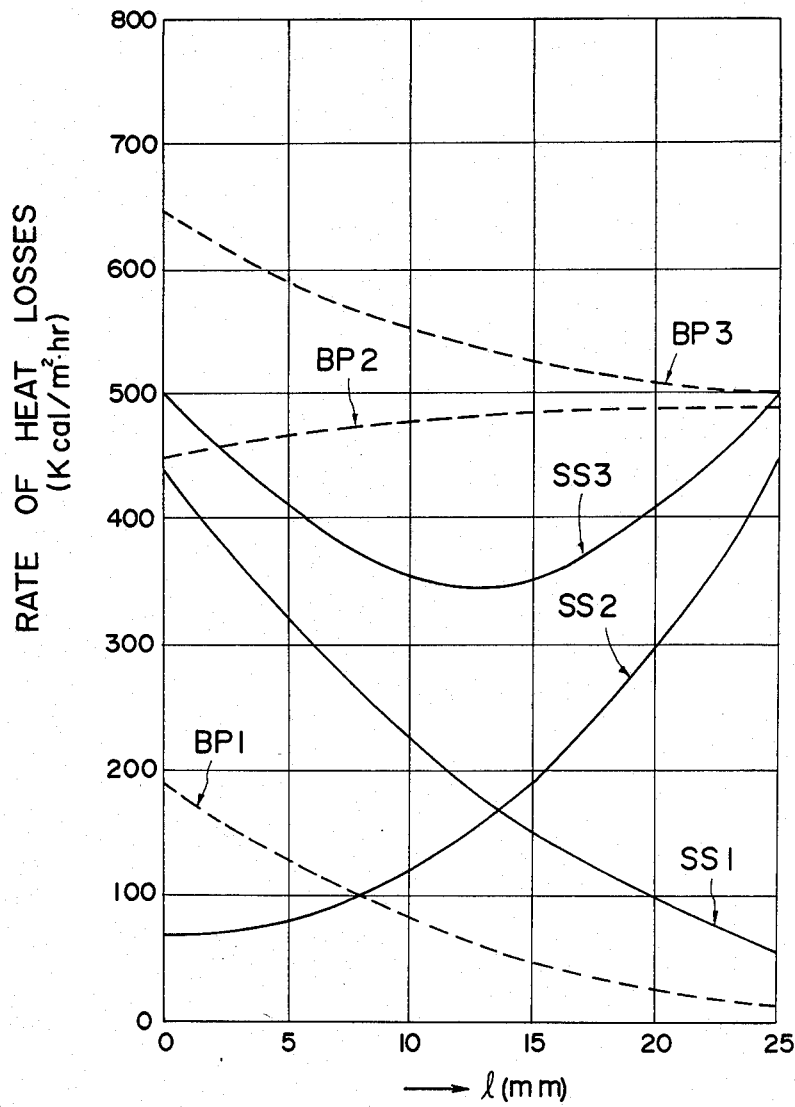
FIG. 6 is a chart showing other rate of heat losses from a solar heat collector.
Figure 7:
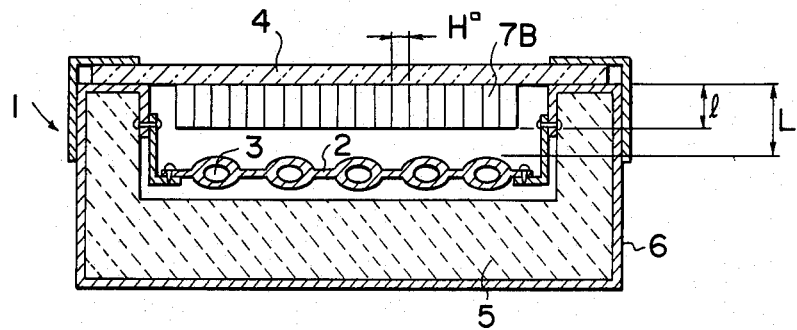
FIG. 7 is a sectional view showing the solar heat collector used for obtaining tee characteristic curves shown in FIG. 6.

FIG. 6 is a chart showing the influences rendered to the rate of heat losses from the solar heat collector by the height of the transparent heat trap disposed in contact with the transparent sheet. In this experiment, as shown in FIG. 7, a heat trap 7B formed of collectively assembled square pillars each being hollow and having openings of H×H (5 mm×5 mm) was disposed in contact with the transparent sheet 4 within the interval L (25 mm) across the absorber plate 2 and the transparent sheet 4, the height 1 of the heat trap 7B is varied, and then, the rate of heat losses in accordance with the varied heights of the heat trap 7B were measured. Furthermore, in this experiment, an absorber plate subjected at the surface thereof to a black color coating treatment of non-selective absorption and another absorber plate subjected at the surface thereof to a selective absorption surface treatment were used, and the abovedescribed rate of heat losses were measured under the use of the respective absorber plates.

More specifically, in FIG. 6, there are shown a convection heat loss BP1, a radiation heat loss BP2 and a sum of convection and radiation heat losses BP3 under the use of the black color coating treated absorber plate 2 and a convection heat loss SS1, a radiation heat loss SS2 and a sum of convection and radiation heat loss SS3 under tee use of the selective absorption surface treated absorber plate 2 respectively in correspondence to the height of the heat trap 7A. According to the results of the experiment shown in FIG. 6, it was ascertained that the rate of heat losses from heat collector reached the minimum value when the absorber plate 2 was subjected at the surface thereof to the selective absorption surface treatment and the height of the heat trap disposed in contact with the transparent sheet was set at a value substantially equal to $\frac{1}{2}\times L$.

In addition, in the respective embodiments described above, the structure of collectively assembled square pillars each being hollow and having the openings of H×H (5 mm×5 mm) was used as an example of the heat trap, however, it was ascertained that the substantially same results can be obtained even when the heat traps differing from in cross section from one having the form of the collectively assembled square pillars as described above are adopted. Additionally, in the present invention it is desirable that the wall thickness of the heat trap is thin and its emittance is low.

Description will now be given of one embodiment of the present invention with reference to the accompanying drawings.

Figure 8:
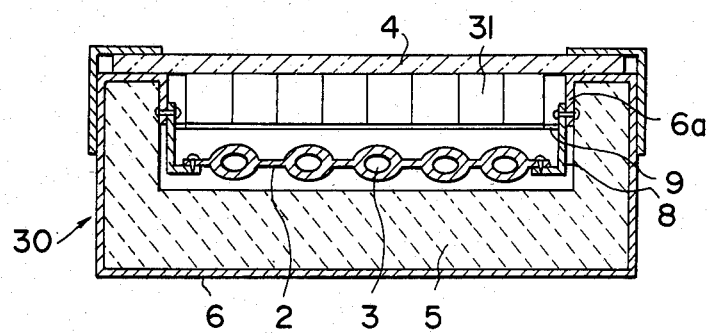
FIG. 8 is a sectional view showing one embodiment of the solar heat collector according to the present invention.
Figure 9:
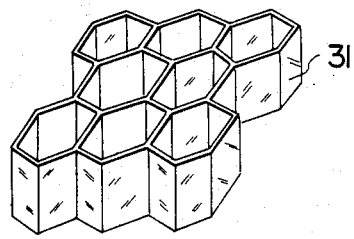
FIG. 9 is a perspective view showing a convection heat loss preventive heat trap used in the solar heat collector according to the present invention as shown in FIG. 8.

FIG. 8 is an explanatory view showing a solar heat collector 30 as an embodiment of the present invention. Similarly to the solar heat collectors of the prior art, the solar heat collector 30 comprises: an absorber plate 2 for converting the solar rays into thermal energy and transmit it to a heat transfer medium; a heat transfer medium flow path 3 forming part of the absorber plate 2; a transparent sheet 4 made of glass or the like for preventing the convection heat loss from the absorber plate 2 and protecting the absorber plate 2 against the contamination and damages caused by the external factors; a heat insulating material 5 for preventing the heat loss through the rear surface of the solar heat collector; and an outer box 6 for totally housing the solar heat collector. The aforesaid absorber plate 2 is formed in such a manner that a multiplicity of tubes being flattened in cross section are connected to a flat plate at regular intervals or two corrugated sheets are bonded to each other to form heat medium flow paths. The absorber plate 2 is subjected at the surface thereof to a selective absorption surface treatment. This absorber plate 2 is detachably mounted on opposing brackets secured to the inner walls 6a of the aforesaid outer box 6 by suitable means.

A honeycomb heat trap 31 formed of a transparent member formed of an ethylene fluoride resin film or the like as a heat trap is disposed between the absorber plate 2 and the transparent sheet 4. The honeycomb heat trap 31 is in contact at the upper end thereof with the aforesaid transparent sheet 4 and supported at the lower end thereof by thin lines 9 such as piano wires stretched across the opposing brackets 8. The height of the honeycomb heat trap 31 is determined to be about $\frac{1}{2}$ of the interval across the absorber plate 2 and the transparent sheet 4. It is suitable to use a fluoroplastics film as the material of the transparent heat trap, for example, a copolymer FEP obtained from 4-fluoroethylene and 6-fluoropropylene, a copolymer PFA obtained from 4-fluoroethylene and perfluoroalkylvinylether and a copolymer ETFE obtained from fluoroethylene and ethylene.

Figure 10:
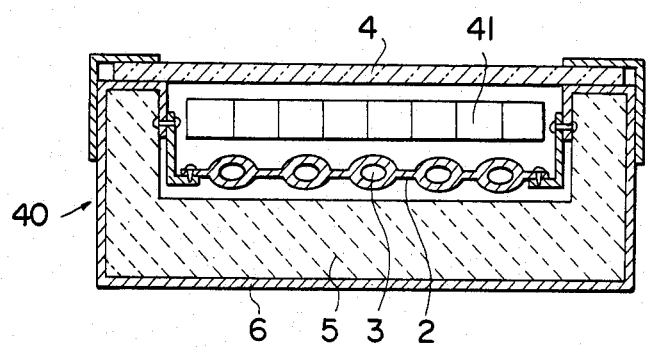
FIG. 10 is a sectional view showing the solar heat collector compared with one shown in FIG. 8.

Description will hereunder be given of the heat collecting characteristics and the structural characteristics, referring to the following table, as compared with the heat collecting characteristics and the structural characteristics of the solar heat collectors 10 and 30 of the prior art and the solar heat collector 40 wherein, as shown in FIG. 10, the honeycomb heat trap 41 is interposed between the absorber plate 2 and the transparent sheet 4 in a manner to contact neither the absorber plate 2 nor the transparent sheet 4. In addition, the effects of the respective characteristics are qualitatively indicated, and further, qualitatively indicated by use of the points of effects attached thereto.

TABLE

| | No. of Solar heat collectors | | | |
|---|---|---|---|---|
| | 30 | 10 | 20 | 40 |
| Effect of Convection Heat Loss Prevention | Medium ② | High ⑤ | Medium ② | Low ① |
| Defect of Radiation Heat Loss Prevention | High ③ | Low ① | Low ① | Medium ② |
| Conduction Heat Loss | Low ③ | High ① | Medium ② | Medium ② |
| Required Maximum Service Temperature | Low ③ | High ① | High ① | Medium ② |
| Destructivity | Non-destructable ③ | Destructable ① | Non-destructable ③ | Non-destructable ③ |
| Points of Total Effects | ⑭ | ⑦ | ⑨ | ⑩ |

Figure 1:
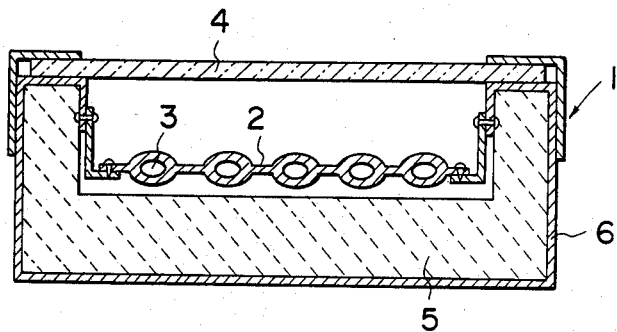
FIG. 1 is a sectional view showing a conventional solar heat collector widely used.
Figure 2:
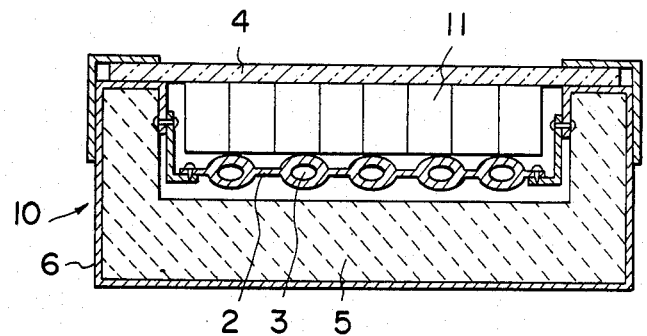
FIGS. 2 and 3 are sectional views showing the solar heat collectors of the prior art, respectively.

As with the solar heat collector 10 shown in FIG. 2, the effect of convection heat loss prevention is high when spaces formed by the honeycomb heat trap 11 between the absorber plate 2 and the transparent 4 are completely partitioned, while, as with the solar heat collector 40 shown in FIG. 10, the effect of convection heat loss prevention is low when the honeycomb heat trap 41 is open at both the upper and lower ends. As with the solar heat collector 30 shown in the embodiment of the present invention, the effect of the convection heat loss prevention is medium when the honeycomb heat trap 31 is at the lower end only.

Figure 3:
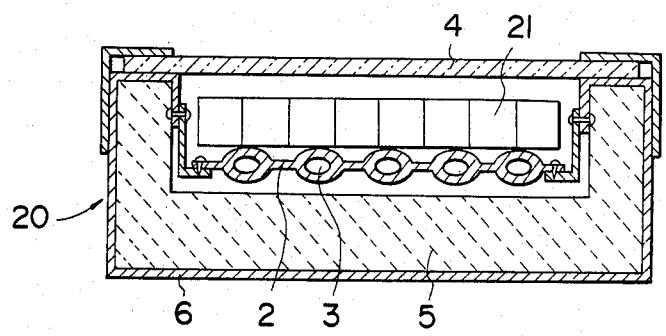

The effect of radiation heat loss prevention becomes high by the selective absorption surface treatment applied to the surface of the absorbed plate 2. In the solar heat collectors 10 and 20 in which the honeycomb heat traps 11 and 21 as shown in FIGS. 2 and 3, respectively, are provided in contact with the absorber plates 2, the honeycomb heat traps 11 and 21 are heated to radiate large quantities of infrared rays, and in spite of the selective absorption surface treatment applied to the surfaces of the absorber plates 2, a high effect of radiation heat loss prevention cannot be achieved. In contrast thereto, in the solar heat collector 30 shown in the abovedescribed embodiment of the present invention, the honeycomb heat trap 31 is disposed between the absorber plate 2 and the transparent sheet 4 in a manner to be spaced apart from the absorber plate 2 as far as possible, whereby the honeycomb heat trap 31 itself is suppressed in temperature rise, so that a satisfactory effect of radiation heat loss prevention can be achieved.

In the solar hear collector 30 shown in the above-described embodiment of the present invention, wherein the honeycomb heat trap 31 is not in contact with the absorber plate 2 and the temperature of the honeycomb heat trap 31 is low, whereby the thermal conductivity becomes low, thereby enabling to minimize the conduction heat loss.

As with the solar heat collectors 10 and 20 shown in FIGS. 2 and 3 in which the honeycomb heat traps 11 and 21 are in contact with the absorber plates 2, the maximum service temperature required becomes high, whereas, with the solar heat collector 30 shown in the abovedescribed embodiment of the present invention, in which the honeycomb heat trap 31 is not in contact with the absorber plate 2 and spaced apart from the surface of the absorber plate 2 to a considerable extent, a temperature as low as 150° to 160° C. suffices for a service temperature.

The destructibility of the honeycomb heat trap is such that, when the honeycomb heat trap 11 is immovably confined between the absorber plate 2 and the transparent sheet 4 as in the solar heat collector 10 shown in FIG. 2, the destruction occurs, that, whereas, when the honeycomb heat trap 31 is movable toward the absorber plate 2 as the transparent sheet 4 is deformed as in the solar heat collector 30 shown in the abovedescribed embodiment of the present invention, no destruction occurs.

Figure 11:
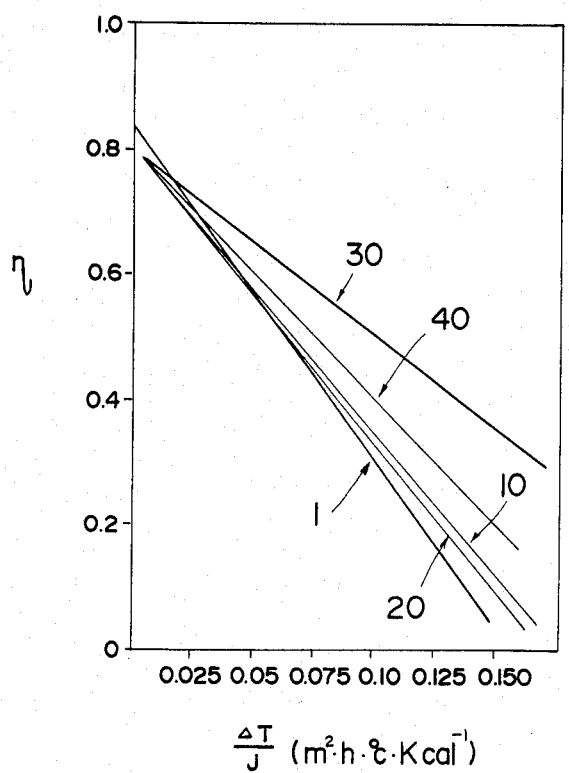
FIG. 11 is a chart showing the heat collecting efficiencies of the solar heat collectors.

FIG. 11 is a chart showing the collector efficiency $\eta$vs $\Delta T/J$, wherein $\Delta T$ is a temperature difference (° C.) between the ambient temperature and the mean temperature of the heat transfer medium, J is an amount of solar radiation per unit of absorbing area (Kcal $m^{-2}h^{-1}$), whereby the solar heat collector 30 shown in the abovedescribed embodiment of the present invention is compared in collector efficiency with the aforesaid solar heat collectors 1, 10, 20 and 40 of the prior art. FIG. 11 shows that, in the normal heat collecting zone of the solar heat collector excluding the low heat collecting zone, the solar heat collector 30 shown in the above-described embodiment of the present invention is outstanding in the collector efficiency.

Figure 12:
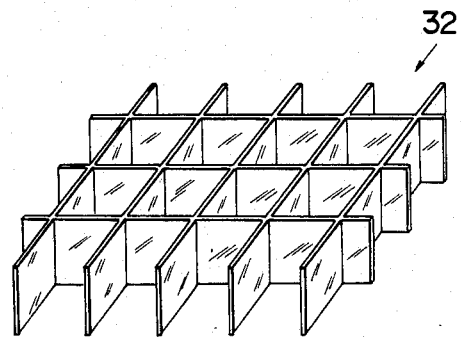
FIGS. 12, 13, 14 and 15 are perspective views showing convection heat loss preventive heat traps applicable to the solar heat collector according to the present invention.
Figure 13:
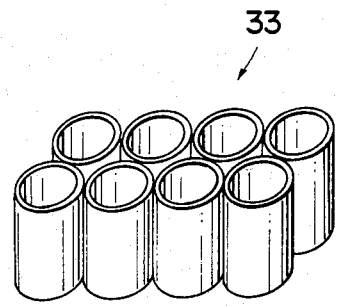

In the solar heat collector 30 shown in the abovedescribed embodiment of the present invention, description has been given of the case where the honeycomb heat trap 31 is applied as the trap, however, this honeycomb heat trap 31 may be replaced with the transparent heat trap 32 formed of collectively assembled square pillars as shown in FIG. 12 or the heat trap 33 formed of collectively assembled cylinders as shown in FIG. 13.

Figure 14:
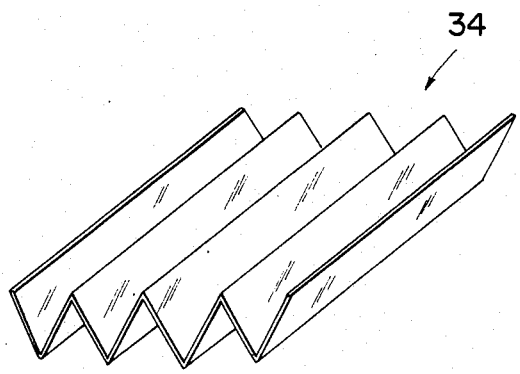
Figure 15:
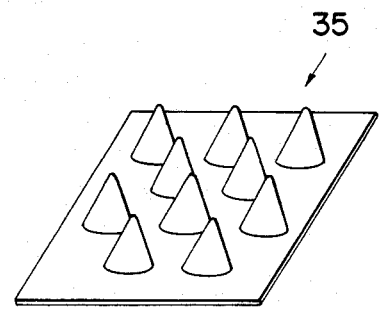

Further, the honeycomb heat trap 31 of the solar heat collector 30 shown in the abovedescribed embodiment may be replaced with a continuous heat trap 34 being bent into continuous V-shapes in cross section at substantially a regular pitch and formed of a transparent member similar to the honeycomb heat trap 31 as shown in FIG. 14 or a heat trap 35 formed of arranged cones as shown in FIG. 15. The V-shaped heat trap 34 divides an intermediate air space layer between the absorber plate 2 and the transparent sheet 4 into two groups of spaces and the area thereof being in contact with the transparent sheet 4 becomes small, whereby the convection suppressing effect is enhanced, so that the conduction heat loss can be suppressed.

As has been described hereinabove, according to the present invention, in the solar heat collector having the absorber plate in its box member which is provided at the surface thereof with the transparent sheet, the absorber plate is subjected at the surface thereof to the selective absorption surface treatment, there is the transparent heat trap having a height of about ½ of the interval across the transparent sheet and the absorber plate between the transparent sheet and the absorber plate in a manner to be in contact with the transparent sheet, so that such advantages can be achieved that the maximum service temperature of the heat trap material becomes low, the heat the is not destructed by an external force and it is possible to suppress the heat losses in three forms due to the convection, radiation and conduction.

What is claimed is:

1. A solar heat collector comprising:
an outer box having an open upper portion for receiving the solar rays;
a heat insulating material laid on the entire bottom and inner side wall surfaces of said outer box for preventing the heat loss through said bottom and side walls of said outer box;
an absorber plate provided in said outer box and having a passage for a heat collecting liquid, said absorber plate being covered by a selective absorption surface which is adapted to absorb said solar rays, convert said solar rays into thermal energy an transfer said thermal energy to said heat collecting liquid, while preventing re-radiation of said thermal energy from said selective absorption surface;
a transparent sheet mounted on said open upper portion of said outer box adapted to allow said solar rays to pass therethrough while preventing convection heat loss from said absorber plate and protecting said absorber plate against contamination and damage caused by external factors; and
a convection loss preventing structure disposed between said absorber plate and said transparent sheet and made of a fluoroplastics film capable of transmitting solar radiation rays including visible and near-infrared rays as well as infrared rays therethrough, said convection loss preventing structure having a height which is about $\frac{1}{2}$ of the interval between said transparent sheet and said absorber plate and extending above and over substantially the entire area of said absorber plate while making contact at its upper end with said transparent sheet such a to leave between the lower end thereof and said absorber plate a clearance which is about $\frac{1}{2}$ of said interval between said absorber plate and said transparent sheet.

2. A solar heat collector according to claim 1, wherein said convection loss preventing means has a honey-comb type construction.

3. A solar heat collector according to claim 1 wherein said convection loss preventing structure is of collectively assembled square pillars.

4. A solar heat collector according to claim 1, wherein said convection loss preventing means is of collectively assembled cylinders.

5. A solar heat collector according to claim 1, wherein said convection loss preventing structure is formed into continuous V-shaped in cross-section at a substantially regular pitch.

6. A solar heat collector according to claim 1, wherein said convection loss preventing structure is of collectively arranged cones.

* * * * *